Sept. 14, 1937.  E. WHIDDON  2,093,064
RAKE
Filed July 20, 1936
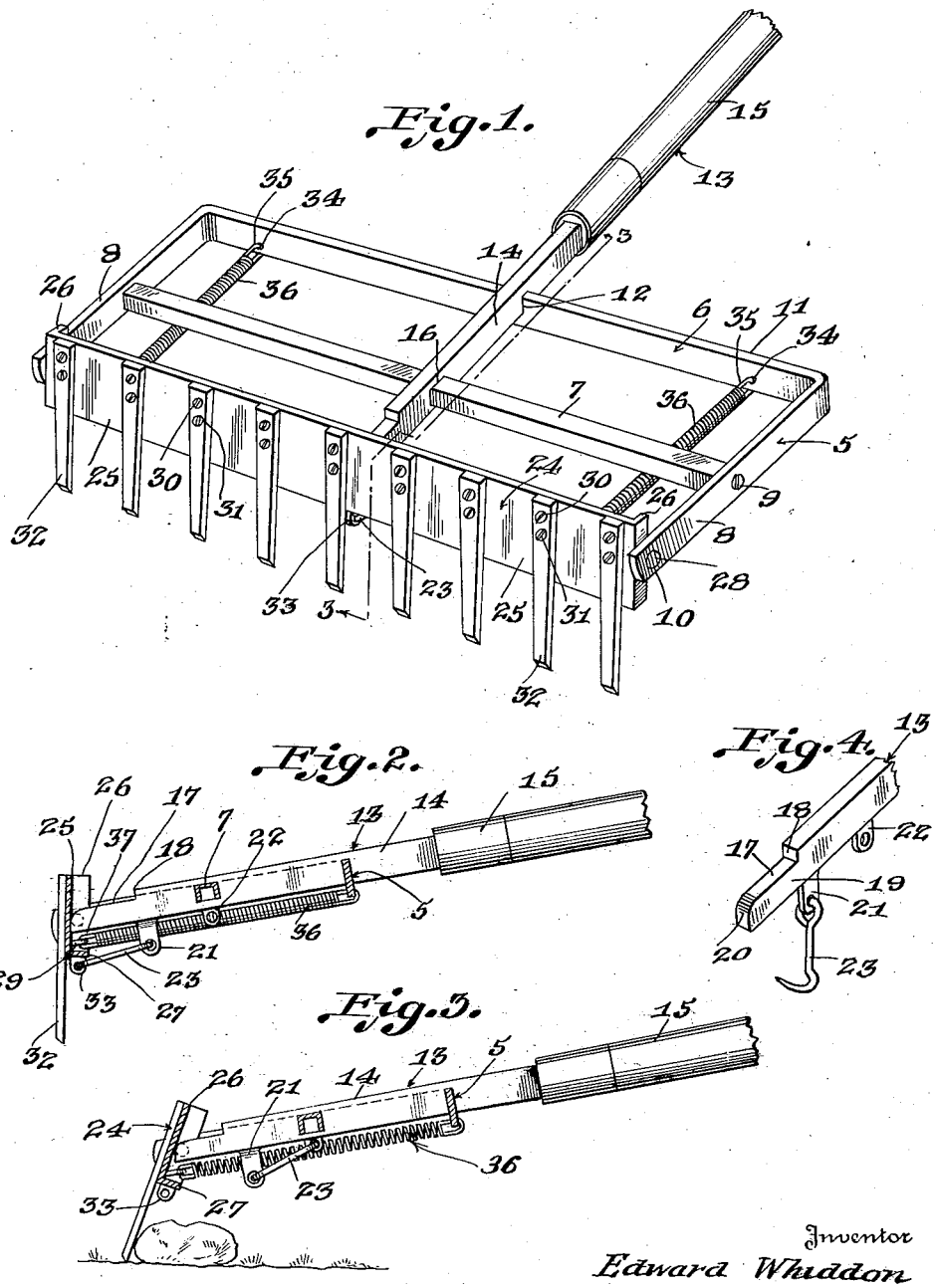
Inventor
Edward Whiddon
By Kimmel & Crowell
Attorneys Patented Sept. 14, 1937

2,093,064

UNITED STATES PATENT OFFICE 2,093,064

RAKE

Edward Whiddon, Jacksonville, Fla.

Application July 20, 1936, Serial No. 91,599

8 Claims. (Cl. 55—10)

This invention appertains to rakes, and more particularly to hand rakes adapted for garden and lawn uses and the like.

The object of the invention is to provide, in a manner as hereinafter set forth, a rake including a head capable of being selectively arranged in fixed position or in pivoted resilient position, relative to a carrier therefor, when occasion requires.

Further objects of the invention are to provide, in a manner as hereinafter set forth, a rake for the purpose referred to which is simple in its construction and arrangement, strong, durable, thoroughly efficient in its use, conveniently adjusted to provide a fixed or a pivoted resilient raking head when desired, readily assembled, expeditiously repaired when required and comparatively inexpensive to manufacture.

With the foregoing and other objects in view, the invention consists of the novel construction, combination and arrangement of parts as will be more specifically described and are as illustrated in the accompanying drawing wherein is shown an embodiment of the invention, but it is to be understood that changes, variations and modifications may be resorted to which fall within the scope of the invention as claimed.

In the drawing:—

Figure 1 is a perspective view of the rake with the head thereof in pivoted resilient position, Figure 2 is a longitudinal sectional view of the rake with the head thereof in fixed position, Figure 3 is a section on line 3—3, Figure 1 with a tooth of the rake meeting with an obstruction, and Figure 4 is a fragmentary view, in perspective, illustrating the forward portion of the handle member and the latching member for the head.

The rake includes a carrier element 5 formed of a horizontally disposed yoke 6 and a brace bar 7 which is arranged between and secured to the sides 8 of the yoke, as at 9. The yoke 6 is formed with a pair of openings 10 in proximity to the forward ends of the sides 8. The openings 10 align, but only one opening 10 is shown. The base 11 of yoke 6 is notched in its top edge, as at 12.

There is associated with the carrier 5 a handle member 13 formed of a shank 14 and a handle 15. The shank 14 which is rectangular in vertical section extends forwardly from the handle 15, seats in the notch 12 and is provided with a rectangular opening 16 through which extends the brace bar 7. The forward portion of the top edge of the shank 14 is rabbeted to provide a clearance for the raking head, to be referred to. The rabbeted edge of shank 14 provides a seat 17 and a shoulder 18 on the shank, and also forms the latter with a reduced forward end terminal portion 19. The forward end of portion 19 is rounded, as at 20. The bottom edge of the shank 14 immediately rearwardly of the portion 19 is formed with a pair of spaced parallel depending apertured lugs 21, 22. The lug 21 is of greater length than lug 22 and has loosely connected thereto a latching member 23 of hook-like form. The apertured lug 22 is adapted to receive the bill of the member 23 when the latter is in inactive position.

The rake includes a raking head 24 formed of a flat oblong plate 25 disposed on its lower lengthwise edge. The plate 25 at each end is formed with a vertically disposed rearwardly extending flange 26 and at its bottom edge with a horizontally disposed rearwardly extending flange 27 which merges into the bottoms of the flanges 26. These latter have laterally disposed pintles 28 (only one shown) which are pivotally mounted in the openings 10 whereby the head 24 is pivotally supported from carrier 5. Extending rearwardly from the rear face of plate 25 in close proximity to the upper face of flange 27 is a pair of eyes 29 (only one shown) located between the vertical median of plate 25 and the flanges 26. Secured to the forward face of plate 25 by the holdfast devices 30, 31 are teeth 32 which depend below the flange 27. The teeth are arranged in parallel spaced relation and have bevelled edges. Secured or integral with the flange 27 as well as depending therefrom is a keeper 33 for the latching member 23. The keeper 33 is disposed at the transverse median of flange 27.

The base 11 of yoke 6 is formed with spaced parallel openings 34 located in proximity to its lower edge. Extending through the openings 34 and connected to the base 11 are the follower ends 35 of a pair of controlling springs 36 which function for resiliently connecting the plate 25 to the carrier 5, when the plate 25 is free of the latching member 23. The leading ends 37 of the springs 36 are connected to the eyes 29.

When the latching member 23 is engaged with the keeper 33, the head 24 is fixed stationary relative to the carrier 5. When the member 23 is disconnected from the keeper 33, the head 24 is not only free for pivoting on the carrier 5, but is also resiliently connected to the latter.

The rounded forward end of the shank 14 forms a bearing for the plate 25 when the upper portion of the latter is swung rearwardly when the teeth of the head 24 meet with an obstruction (Figure 3). The rabbet on shank 14 constitutes the clearance referred to and enables the upper portion of the plate 25 to be shifted upon the ledge 17 forwardly of shoulder 18.

The open and closed ends of the carrier are the leading and follower ends respectively thereof.

What I claim is:—

1. A rake comprising a yoke shaped carrier including a leading and a follower end, a raking head arranged within and having rearwardly directed side flanges, pivotally connected to the leading end of the carrier, a handle member connected to and extending forwardly and rearwardly with respect to the follower end of the carrier, said member having its leading end disposed relatively to the inner face of and constituting a bearing for said head, resilient members connected to said head and to the follower end of the carrier, and said handle member and head having coacting means arranged therebelow for latching the head stationary relative to the carrier.

2. A rake comprising a yoke-shaped carrier formed with an open leading end and a closed follower end, a handle member fixed to the carrier, a raking head positioned in said leading end and formed with rearwardly extending side flanges provided with lateral pintles pivotally mounted in the carrier, spaced parallel means for resiliently connecting said head to the follower end of the carrier, and said handle member and head having coacting means depending therefrom for latching the head stationary relative to the carrier.

3. A rake comprising a yoke-shaped frame-like carrier formed with an open leading end and a closed follower end, a handle member fixed at spaced points thereof to and extending into the open end of the carrier, a raking head positioned in said leading end and formed with side flanges provided with lateral pintles pivotally mounted in the carrier, means for resiliently connecting said head to the follower end of the carrier, a keeper depending from said head, and a latching member connected to the lower face of the handle member and coacting with the keeper for latching said head stationary relative to the carrier.

4. A rake comprising a yoke-shaped carrier having an open leading end and a closed follower end, a raking head arranged within said leading end and having oppositely disposed laterally extending pintles pivotally mounted in the sides of the carrier, spaced resilient connections between said head and the said follower end, a handle member attached to the carrier and including a leading terminal portion formed with a bearing for the head, said leading terminal portion being formed with a rabbet in its top edge rearwardly of said bearing to provide a clearance for the head.

5. A rake comprising a yoke-shaped carrier having an open leading end and a closed follower end, a raking head arranged within said leading end and having oppositely disposed laterally extending pintles pivotally mounted in the sides of the carrier, spaced resilient connections between said head and the said follower end, a handle member attached to the carrier and including a leading terminal portion formed with a bearing for the head, said leading terminal portion being formed with a rabbet in its top edge rearwardly of said bearing to provide a clearance for the head, and coacting means carried by the head and handle member for latching said head stationary relative to the carrier.

6. A rake comprising a yoke-shaped carrier having an open leading end and a closed follower end, a raking head arranged within said leading end and having rearwardly extending side flanges provided with oppositely disposed laterally extending pintles pivotally mounted in the leading ends of the sides of the carrier, spaced resilient connections between said head and said follower end, a handle member attached to the carrier and including a leading terminal portion formed with a bearing for the head, said leading terminal portion being formed with a rabbet in its top edge rearwardly of said bearing to provide a clearance for the head, and coacting means carried by the head and handle member for latching said head stationary relative to the carrier, the said coacting means being connected to the bottoms of said head and the handle member.

7. A rake comprising a yoke-shaped carrier including an open leading end and a closed follower end, said carrier having a pair of sides and a brace bar connected at its ends to said sides, a raking head arranged within said leading end and pivotally connected to the leading ends of said sides, a handle member connected to said brace and follower end of said carrier and extending to said raking head, a pair of controlling springs, each having its ends connected to said head and follower end in proximity to a side of the head and one of the sides of the carrier, said springs arranged below said handle member, said handle member being formed with a bearing for the head and a rabbet in its top edge providing a clearance for the head rearwardly of the bearing, a keeper depending from the head, and a latching member loosely connected to said member and coacting with said keeper for latching said handle member and head together.

8. A rake comprising a yoke-shaped carrier including an open heading end and a closed follower end, said carrier having a pair of sides and a brace bar connected at its ends to said sides, a raking head arranged within said leading end and pivotally connected to the leading ends of said sides, a handle member connected to said brace and follower end of said carrier extending to said raking head, a pair of controlling springs, each having its ends connected to said head and follower end in proximity to a side of the head and one of the sides of the carrier, said springs arranged below said handle member, said handle member being formed with a bearing for the head and a rabbet in its top edge providing a clearance for the head rearwardly of the bearing, a keeper depending from the head, a latching member loosely connected to said handle member for coacting with said keeper and latching said handle member and head together, and means depending from said handle member for releasably suspending said latching member in non-latching position in lengthwise relation with respect to the handle member.

EDWARD WHIDDON.